(12) United States Patent
Ries et al.

(10) Patent No.: US 11,318,400 B2
(45) Date of Patent: May 3, 2022

(54) TOP AND BOTTOM LOADED FILTER AND LOCKING MECHANISM

(71) Applicant: Caterpillar Inc., Peoria, IL (US)

(72) Inventors: Jeffrey R. Ries, Metamora, IL (US); Jon T. Immel, Chillicothe, IL (US); Darrell Lee Morehouse, III, Bedford, TX (US); Stephen Ellis Oedewaldt, Mapleton, IL (US); Philip Carl Spengler, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 16/799,193

(22) Filed: Feb. 24, 2020

(65) Prior Publication Data

US 2021/0260508 A1 Aug. 26, 2021

(51) Int. Cl.
*B01D 29/96* (2006.01)
*B01D 29/15* (2006.01)

(52) U.S. Cl.
CPC ............. *B01D 29/96* (2013.01); *B01D 29/15* (2013.01); *B01D 2201/291* (2013.01); *B01D 2201/347* (2013.01); *B01D 2201/4007* (2013.01); *B01D 2201/4053* (2013.01)

(58) Field of Classification Search
CPC .. B01D 29/96; B01D 29/15; B01D 2201/291; B01D 2201/347; B01D 2201/4007; B01D 2201/4053; B01D 29/21; B01D 2201/302; B01D 2201/4015; B01D 2201/295; B01D 2201/0415
USPC ................ 210/236, 437, 438, 455, 457, 442
See application file for complete search history.

(56) References Cited

U.S. PATENT DOCUMENTS

| 4,896,783 | A | * | 1/1990 | Leoncavallo | .......... B01D 29/05 |
| | | | | | 215/330 |
| 5,102,541 | A | * | 4/1992 | Breitbach | .............. B01D 29/41 |
| | | | | | 210/232 |
| 6,615,990 | B1 | | 9/2003 | Jokschas et al. | |
| 6,830,683 | B2 | | 12/2004 | Gundrum et al. | |
| 7,662,283 | B2 | | 2/2010 | Eserkaln et al. | |
| 8,268,170 | B2 | | 9/2012 | Core et al. | |
| 8,709,246 | B2 | | 4/2014 | Branscomb | |
| 9,067,154 | B1 | | 6/2015 | Branscomb et al. | |
| 9,492,768 | B2 | | 11/2016 | Fick et al. | |
| 9,776,116 | B2 | | 10/2017 | Honermann et al. | |
| 10,052,575 | B2 | | 8/2018 | Downs et al. | |
| 10,238,998 | B2 | | 3/2019 | Cartarius et al. | |

(Continued)

FOREIGN PATENT DOCUMENTS

| CN | 103071334 B | 10/2014 |
| DE | 3741552 C2 | 10/1994 |

(Continued)

*Primary Examiner* — Madeline Gonzalez
(74) *Attorney, Agent, or Firm* — Law Office of Kurt J. Fugman LLC

(57) ABSTRACT

A filter element includes a bottom open end joined to a center tube opposite the top open end. The bottom open end defines a radially outer surface and a radially inner surface that is in communication with the central reservoir of the filter element. A first locking feature is disposed proximate to the bottom open end. The locking feature includes an entrance slot that is disposed on the radially inner surface of the center tube extending axially from the bottom open end. A similar or identical second locking feature is disposed proximate to the top open end.

6 Claims, 10 Drawing Sheets

(56) References Cited

U.S. PATENT DOCUMENTS

2002/0043506 A1    4/2002   Amstutz et al.
2004/0232064 A1   11/2004   Wilkinson et al.
2005/0178717 A1    8/2005   Bagci et al.
2014/0166563 A1    6/2014   Tubby et al.

FOREIGN PATENT DOCUMENTS

| DE | 102014013818 A1 | 3/2016 |
| JP | S50144963 | 11/1975 |
| JP | 2005349283 A | 12/2005 |
| JP | 3222460 U | 8/2019 |
| KR | 101560751 B1 | 10/2015 |

* cited by examiner

TOP AND BOTTOM LOADED FILTER AND LOCKING MECHANISM

TECHNICAL FIELD

The present disclosure relates generally to canister style filter systems that employ a replaceable filter element. More specifically, the present disclosure relates to a filter element that includes a locking feature for retaining the filter element in a desired position while providing a seal that helps to ensure that dirty fluid is filtered by the filtering medium of the filter element.

BACKGROUND

Liquid filter systems are known for filter various fluids such as gas, oil, diesel fuel, etc. to remove contaminants from these fluids. In diesel engines, for example, a fuel line filter is used to separate out water and debris from the fuel. These contaminates may accumulate in a lower portion of the filter housing (may also be referred to as a canister). Typically, the center tube of the filter element provides support for the filter media but may not always provide the desired location and retention.

U.S. Pat. Application Publication No. 20060207948 to Hacker et al. discloses a fluid filter assembly including a housing, a service cover, a center tube removably secured to the service cover, and a filter cartridge removably sealed and circumscribing the center tube, and a seal arrangement. The seal arrangement is between the center tube and portions of the housing to close a drainage change to the flow of a clean fluid flow therethrough, when the fluid filter assembly is operating to filter the fluid.

During normal operation in Hacker, the fluid filter assembly operates to allow fluid to flow into the housing through an inlet channel, through the filter cartridge, through openings in the center tube, and out of the housing through the outlet channel. Methods for servicing include removing a service cover from a housing to remove, together with the service cover, a center tube, and open a drainage flow passageway from the housing. Next a filter cartridge is removed from the center tube, and a new filter cartridge is operably mounted on the center tube. Next, the service cover with the center tube having the new filter cartridge is operably mounted in the housing to close the drainage flow passageway.

In Hacker, methods of filtering will direct fluid to be filtered into a housing having a removable and replaceable filter cartridge; then direct the fluid through a tubular region of filter media in the cartridge; then through fluid openings in a center tube; and into a clean fluid flow passageway. Example methods include preventing fluid to bypass the filter media by removably sealing the filter cartridge to the center tube. Example methods will also include preventing fluid from flowing into a drainage passageway by removably sealing the center tube to other portions of the filter housing. Systems utilizing filter assemblies described in Hacker include fuel systems, lube systems, and hydraulic systems.

Hacker fails to disclose a feature on the center tube that may be used to both position and retain the filter element in a desired position while also providing a seal that forces dirty fluid to pass through the filter medium of the filter element before exiting the filter element.

SUMMARY OF THE DISCLOSURE

A filter element that includes at least a partially annular configuration and that defines a longitudinal axis, a radial direction, and a circumferential direction according to an embodiment of the present disclosure is provided. The filter element may comprise an annular filter media defining a central passage, a center tube that is disposed in the central passage of the annular filter media that defines a central reservoir, and the annular filter media surrounds the center tube and the central reservoir. A top open end may be joined to the center tube disposed along the longitudinal axis, the top open end including an opening allowing fluid to flow from the central reservoir to the outside of the filter element. A bottom open end may be joined to the center tube opposite the top open end disposed along the longitudinal axis, the bottom open end defining a radially outer surface and a radially inner surface that is in communication with the central reservoir. A first locking feature may be disposed proximate to the bottom open end, the first locking feature including a first entrance slot that is disposed on the radially inner surface of the center tube extending axially upwardly from the bottom open end, and a first ramp slot extending axially upwardly and circumferentially counterclockwise from the first entrance slot along a first predetermined direction, the first ramp slot being in communication with the first entrance slot. A second locking feature may be disposed proximate to the top open end, the second locking feature includes a second entrance slot that is disposed on the radially inner surface of the center tube extending axially downwardly from the top open end, and a second ramp slot extending axially downwardly and circumferentially clockwise from the second entrance slot along a second predetermined direction, the second ramp slot being in communication with the second entrance slot.

A pair of pedestals for use with a canister filter system and a filter element according to an embodiment of the present disclosure is provided. Each of the pair of pedestals may comprise an at least partially annular body defining a longitudinal axis, a radial direction, and a circumferential direction, and may include a top annular portion terminating at a top free end, and a tab extending radially from the top annular portion, the tab including a first axial surface, a bottom circumferential surface, and a bottom ramp surface extending from the bottom circumferential surface.

A canister filter system according to an embodiment of the present disclosure may comprise a filter element that includes at least partially a cylindrical configuration and that defines a longitudinal axis, and a radial direction. The filter element may comprise an annular filter media defining a central passage, a center tube that is disposed in the central passage of the annular filter media that defines a central reservoir, and the annular filter media surrounds the center tube and the central reservoir. A top open end may be joined to the center tube disposed along the longitudinal axis, the top open end including an opening allowing fluid to flow from the central reservoir to the outside of the filter element, and a bottom open end may be joined to the center tube opposite the top open end disposed along the longitudinal axis. A canister may be provided that includes a top open end, and a bottom closed end or a bottom open end disposed along the longitudinal axis. A base that is configured to be attached to the canister may also be provided, as well as a bottom pedestal including an at least partially annular body defining a longitudinal axis, a radial direction, and a circumferential direction. The bottom pedestal may include a top annular portion terminating at a top free end and defining a top diameter, a bottom annular portion defining a bottom diameter that is greater than the top diameter, and a tab extending radially from the top annular portion. The bottom pedestal may rest on the bottom closed end of the canister, and the filter seal may be disposed below the tab of the bottom pedestal and around the bottom annular portion while contacting the canister. A top pedestal may also be provided that comprises a top tab, the top pedestal being operatively associated with the base.

DETAILED DESCRIPTION

Figure 1:
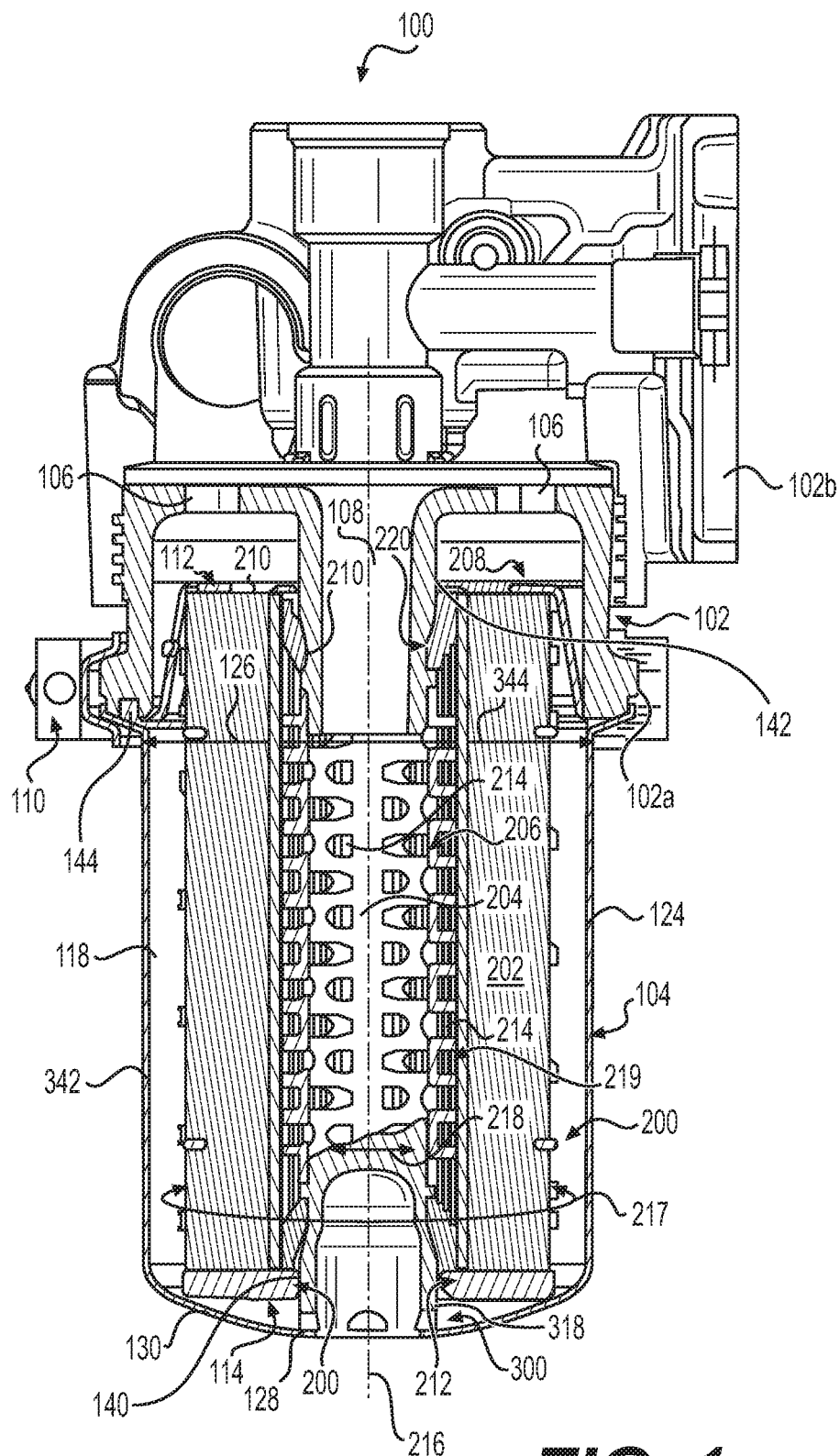
FIG. 1 is a front sectional view of a filter assembly that includes a filter base, a canister, and a filter element including a center tube with a locking feature according to an embodiment of the present disclosure, and a pedestal that is configured to mate with the locking feature.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

First, a filter system will now be described to give the reader the proper context for understanding how various embodiments of the present disclosure are used. It is to be understood that this description is given as exemplary and not in any limiting sense. Any embodiment of an apparatus or method described herein may be used in conjunction with any filter system.

Then, a filter element that may include a center tube with a locking feature according to various embodiments will be discussed. This feature may be located in the bottom end of a liquid filter assembly with a reusable housing (may be referred to as a canister), and it may position the filter element radially and axially in the canister (may also be referred to as the housing) while also separating the clean fluid from the dirty fluid on different sides of the filter medium via a seal. In fuel-water separators, the positioning geometry may be configured to create a chamber for collecting water (i.e. a water bowl) or debris by preventing the element from extending to the bottom of the canister.

FIG. 1 illustrates a canister filter system 100 that may use a filter element 200, and a pedestal 300 according to various embodiments of the present disclosure.

The canister filter system 100 may include having a base 102 (shown to be split up into a base adapter 102a and a filter base 102b, but could be one integral component), a canister 104, a pedestal 300, and a filter element 200. The canister filter system 100 may be used to filter fluids such as diesel or gasoline or other liquid fuels, lubrication oil, hydraulic fluid for hydraulic power systems, transmission fluid, or even possibly intake air for an engine. The canister filter system 100 may also be used as a fuel/water separator filter. The canister filter system 100 with the features described herein could be adapted by those of ordinary skill in this art to serve many different purposes and suit many other applications.

The base 102 includes an inlet channel 106 for fluid to enter into the canister filter system 100, and an outlet channel 108 for fluid to exit from the canister filter system 100. A clip 110 is provided to attach the canister 104 to the base 102. Other attachment structure such as threads may be used.

Figure 2:
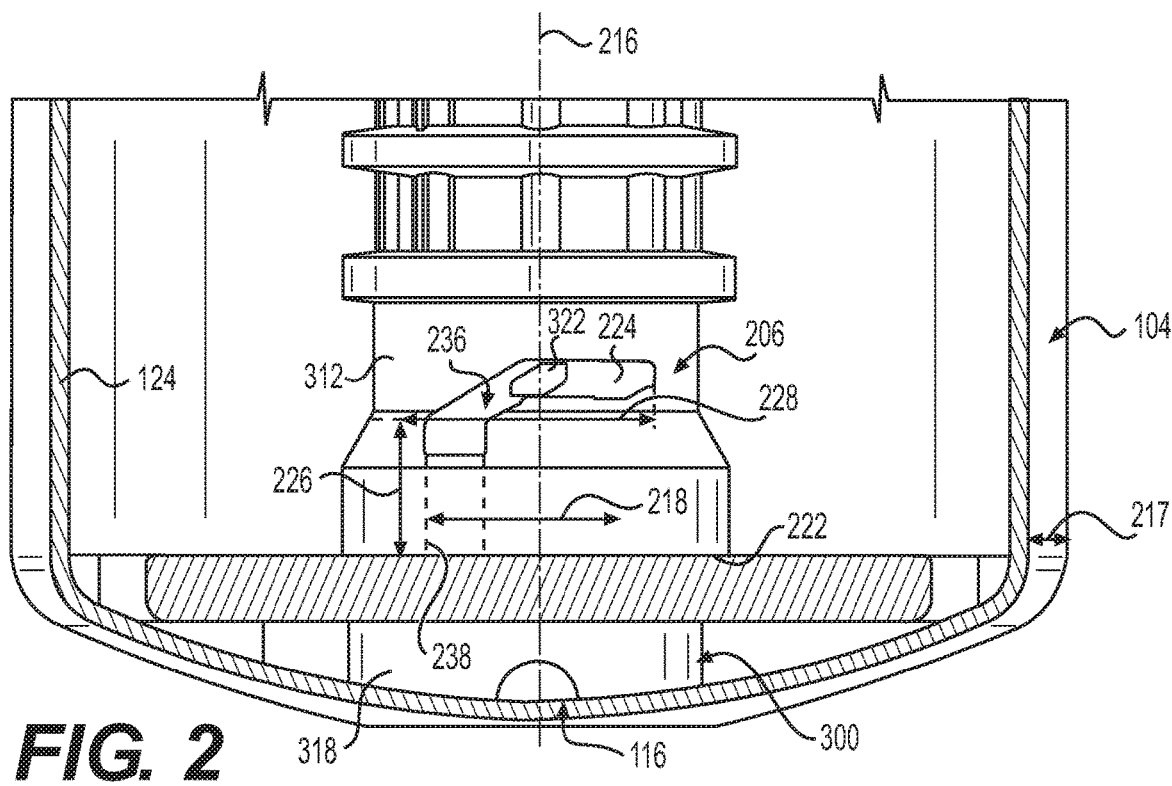
FIG. 2 is a front sectional view of the bottom portion of a filter assembly similar to that of FIG. 1 with the annular filter media removed, showing the mating of the pedestal with the locking feature of the center tube according to an embodiment of the present disclosure.
Figure 3:
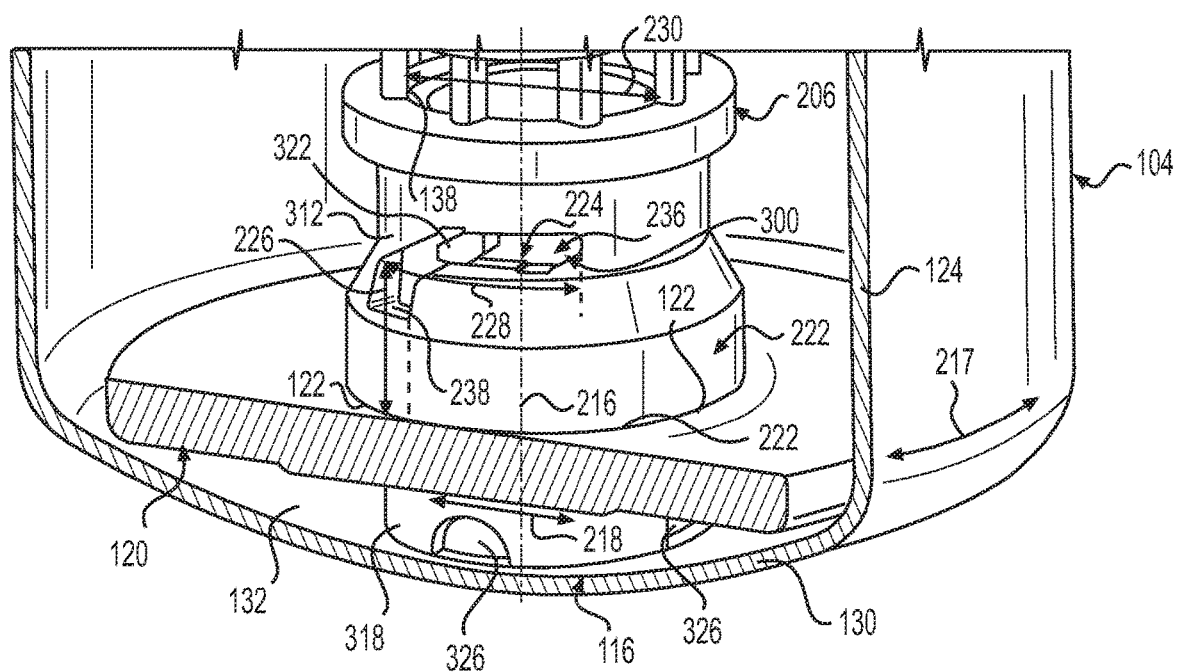
FIG. 3 is a perspective view of the filter assembly of FIG. 2 illustrating how the pedestal rests or extends from the bottom of the canister.

The canister 104 includes a top open end 112 and a bottom open end 114 as shown in FIG. 1 or a bottom closed end 116 as shown in FIGS. 2 and 3.

The filter element 200 may take many different forms to suit a particular application. In the illustrated embodiment, the filter element 200 is well suited for filtering fuel or lubrication oil. The filter element 200 may include annular filter media 202 circumferentially surrounding a central reservoir 204 defined by a center tube 206. Axial ends of annular filter media 202 are shown to be sealed by end caps.

A top end cap 208 may define an axial open end of filter element 200. The top end cap 208 is termed "open" because it includes an opening 210 for allowing passage of fluid.

On the other hand, the bottom end cap 212 defines an axial closed end of filter element 200. The bottom end cap 212 is termed "closed" because it prevents any fluid outside the filter element 200 adjacent the axial end of the annular filter media 202 from flowing unfiltered into center tube 206.

The top end cap 208 and the bottom end cap 212 may each be joined to the center tube 206 via welding, adhesives, etc. Alternatively, several or all of center tube 206, the top end cap 208, and the bottom end cap 212 may be constructed as unitary components. Conversely, the bottom end cap 212 and/or the top end cap 208 may be separate components from the center tube 206, etc. Further details of the closed configuration of the bottom of the canister filter system 100 and the filter element 200 will be discussed later herein.

In operation, fluid to be filtered enters from the inlet channel 106 and flows to the annular cavity 118 between canister 104 and the annular filter media 202. The fluid then passes into and through filter media 202, then into the center tube 206 through the perforations 214 shown therein in FIG. 1.

Then, the fluid exits center tube 206 through the top end cap 208 and opening 210 into the outlet channel 108. The sealed construction at the bottom of the filter element 200 helps to define the fluid channels into and out of the annular filter media 202, preventing any fluid from flowing directly to outlet channel 108 and bypassing the annular filter media 202. To that end, sealing features may be provided that will be discussed in detail later herein. Moreover, it may be desirable to create a chamber (e.g. a water bowl in fuel-water separators, a drain reservoir, etc.) between the bottom of the filter element and the bottom of the canister. So, a positioning feature may be provided as will be discussed later herein.

Referring now to FIGS. 1 thru 3, a canister filter system 100 according to various embodiments of the present disclosure that provides locking and/or positioning feature(s) will now be discussed.

The canister filter system 100 may comprise a filter element 200 that includes at least partially a cylindrical configuration and that defines a longitudinal axis 216, a circumferential direction 217, and a radial direction 218. The filter element 200 may comprise an annular filter media 202 defining a central passage 219 and a center tube 206 that is disposed in the central passage 219 of the annular filter media 220 that defines a central reservoir 204. Thus, the annular filter media 202 surrounds the center tube 206, and the central reservoir 204.

As best seen in FIG. 1, the filter element 200 may further include a top open end 220 joined to the center tube 206 disposed along the longitudinal axis 216. The top open end 220 includes an opening 210 that allows fluid to flow from the central reservoir 204 to the outside of the filter element 200.

Similarly, the filter element 200 may include a bottom open end 222 joined to the center tube 206 opposite the top open end 220 that is also disposed along the longitudinal axis 216. Thus the bottom open end 222 allows insertion of the pedestal 300.

The canister filter system 100 may also include a canister 104 that includes a top open end 112 (see FIG. 1), and a bottom closed end 116 (see FIGS. 2 and 3) relative to the longitudinal axis 216, and a pedestal 300 that rests on the bottom closed end 114 of the canister 104. This may not be the case in other embodiments of the present disclosure such as in FIG. 1 wherein the pedestal 300 is molded integral with the canister 104.

Figure 4:
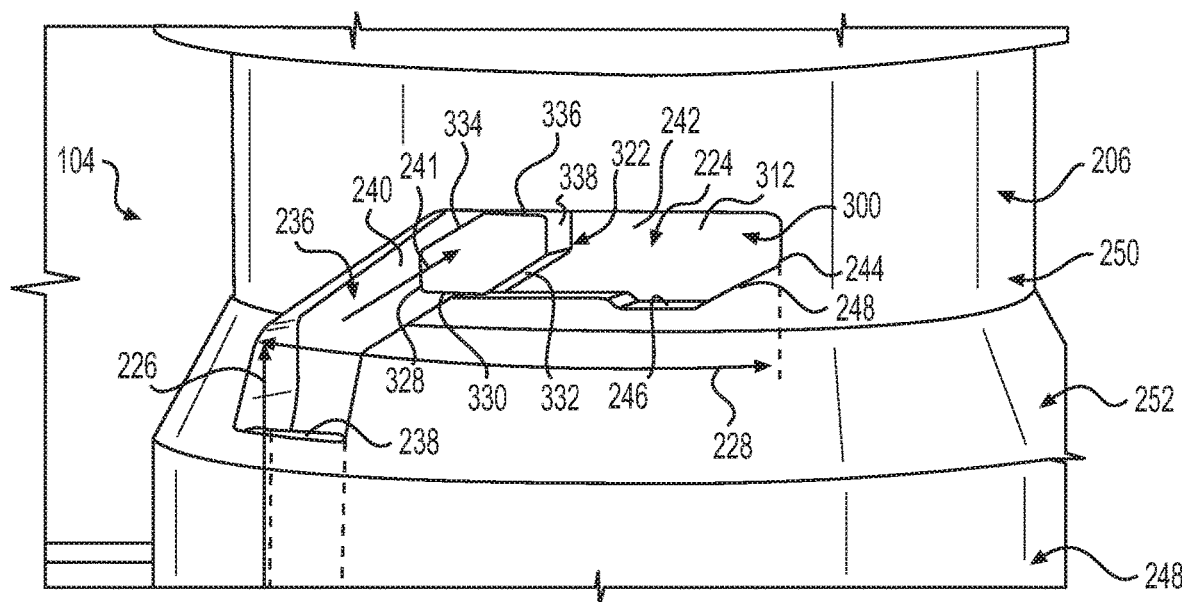
FIG. 4 is an enlarged perspective view of the mating of the tab of the pedestal with the locking feature of the center tube.
Figure 5:
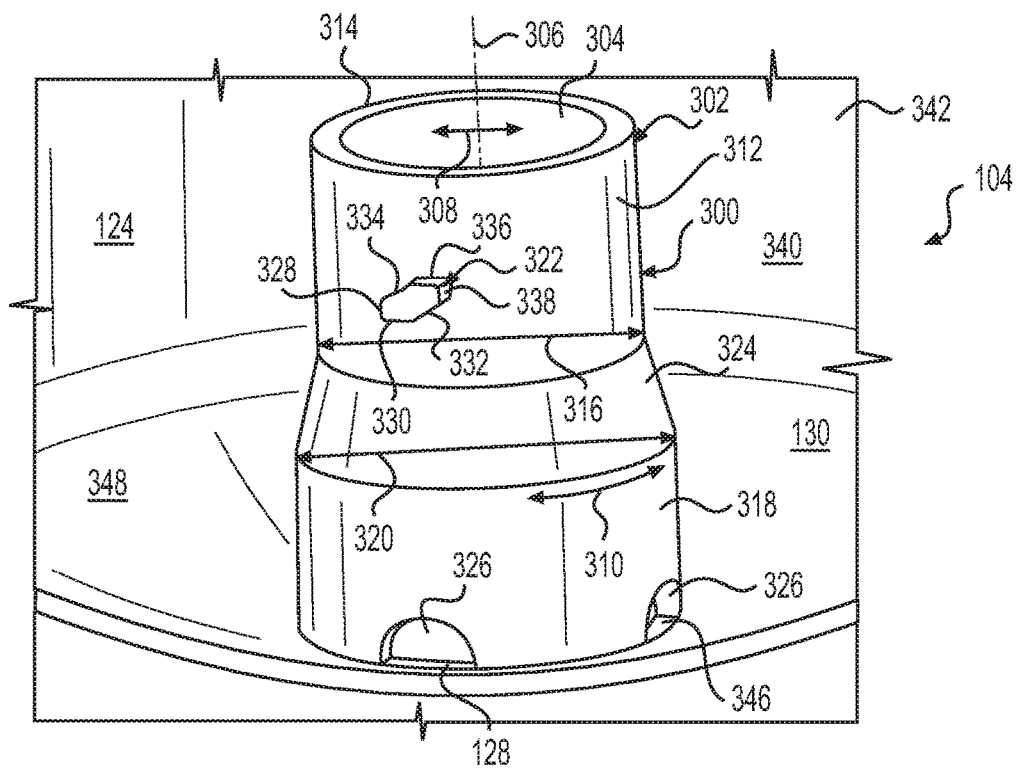
FIG. 5 shows the canister and pedestal shown in isolation from the filter assembly of FIG. 3.

Looking now at FIGS. 2 thru 5, the pedestal 300 may include an at least partially annular body 302 (may be completely annular with a thru-hole 304 extending from end to end as best seen in FIG. 5 or not such as shown in FIG. 1) defining a longitudinal axis 306, a radial direction 308, and a circumferential direction 310 (see FIG. 5, may be concentric with the filter element once assembled).

Focusing on FIG. 5, the body 302 may include a top annular portion 312 terminating at a top free end 314 (regardless of whether it is open or closed) and may also define a top diameter 316 (i.e. top outer diameter), and a bottom annular portion 318 defining a bottom diameter 320 (i.e. bottom outer diameter) that is greater than the top diameter 316.

Figure 6:
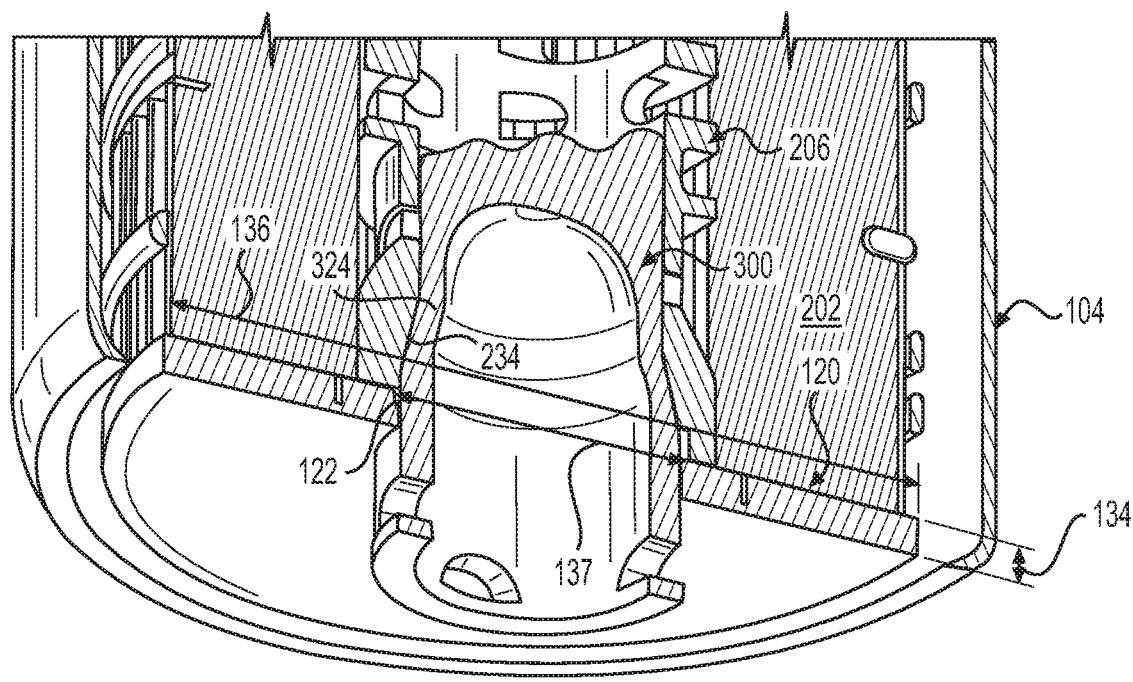
FIG. 6 is a bottom oriented perspective view of the filter seal showing its aperture that is configured to mate with the cylindrical or conical surface of the pedestal.

A tab 322 may extend radially from the top annular portion 312, and a filter seal 120 may be provided that defines an aperture 122 that is configured to mate with the bottom annular portion 318 of the pedestal 300 (see also FIG. 6).

With continued reference to FIG. 5, the pedestal 300 may rest on the bottom closed end 114 of the canister 104. The filter seal 120 may be disposed below the tab 322 of the pedestal 300 and around the bottom annular portion 318 while contacting the canister 104.

More specifically, the canister 104 comprises an outer annular wall 124 that defines an outer diameter 126 (see FIG. 1) that is greater than the bottom diameter 320 of the pedestal 300, a support wall 128 that is configured to support the bottom annular portion 318 of the pedestal 300, and an arcuate wall 130 (other configurations are possible) that connects the support wall 128 to the outer annular wall 124 (see FIG. 5).

As shown in FIG. 3, the filter seal 120 may contact the arcuate wall 130, forming a drain reservoir 132. More particularly, the bottom open end 222 of the center tube 206 may impinge upon the filter seal 120, creating a fluid tight seal between center tube 206 and the filter seal 120, and another fluid tight seal between the filter seal 120 and the arcuate wall 130 of the canister 104.

Looking at FIG. 6, a ratio of the outer diameter 136 to the thickness 134 of the filter seal 120 of the filter seal may range from 10.0 to 30.0, while a ratio of the outer diameter 136 to the hole diameter 137 may range from 1.5 to 3.0. This geometry in addition to the elastomeric composition of the filter seal may provide the suitable balance between rigidity and flexibility to allow the center tube and pedestal to be connected while providing the water tight seals. For example, a material of urethane having a durometer of 55 to 65 Shore A (e.g. 60 Shore A) may be employed.

Looking at FIGS. 2 thru 4, the center tube 206 includes a locking slot 224 that extends axially from the bottom open end 222 of the center tube 206 an axial distance 226, and then extends circumferentially a circumferential distance 228.

Referring to FIGS. 3 and 5, the center tube 206 may define an inner diameter 230 that is slightly greater (i.e. 0.015 of an inch to 0.030 an inch of clearance) than the top diameter 316 of the pedestal 300 that is disposed within the inner diameter 230, and the tab 322 of the pedestal 300 may be disposed in the locking slot 226, and may be configured to guide the movement of the center tube 206. This arrangement may provide a positioning/centering function. Though not shown, an O-ring or other seal may be provided at this interface 138 to prevent fluid from bypassing the annular filter media 202 in some embodiments such as when the annular filter media does not extend axially past the locking slot.

As best seen in FIG. 5, the pedestal 300 may include a flared annular portion 324 (e.g. a conical shape, an arcuate shape, etc.) that connects the top annular portion 312 to the bottom annular portion 318. This feature may be omitted in other embodiments. As best seen in FIG. 6, the radially inner surface 234 of the center tube 206 may have a matching shaped (e.g. angled or tapered) to ease installation of the center tube/filter element onto the pedestal. This may provide guidance as the tabs enter the locking slots.

Referring once more to FIG. 5, the bottom annular portion 318 may be attached to the canister 104. For example, when the canister and the pedestal are formed by thermoplastic injection molding (e.g. using a polyurethane material, nylon material, etc.), the pedestal may be ultrasonically welded to the canister, molded integrally with the canister, snapped onto the canister, threaded onto the canister etc. Also, a protuberance may extend from the canister about which the pedestal is centered, etc. Other manufacturing methods are possible including sheet metal fabrication, etc. When metal is employed, the pedestal may be attached to the canister via welding, brazing, threading, etc.

The bottom annular portion 318 may define at least one thru-slot 326 that extends radially and possibly axially downwardly through the bottom annular portion 318. This may allow water or debris to exit from the central reservoir 204 of the center tube 206 to the drain reservoir 132 (e.g. see FIG. 3).

Now, a filter element 200 that may be used with the that includes at least a partially annular configuration (e.g. conical, cylindrical, other bodies of revolution, etc.) and that may be used with the canister filter system 100 just described will be discussed with reference to FIGS. 1 thru 4, and 7.

Figure 7:
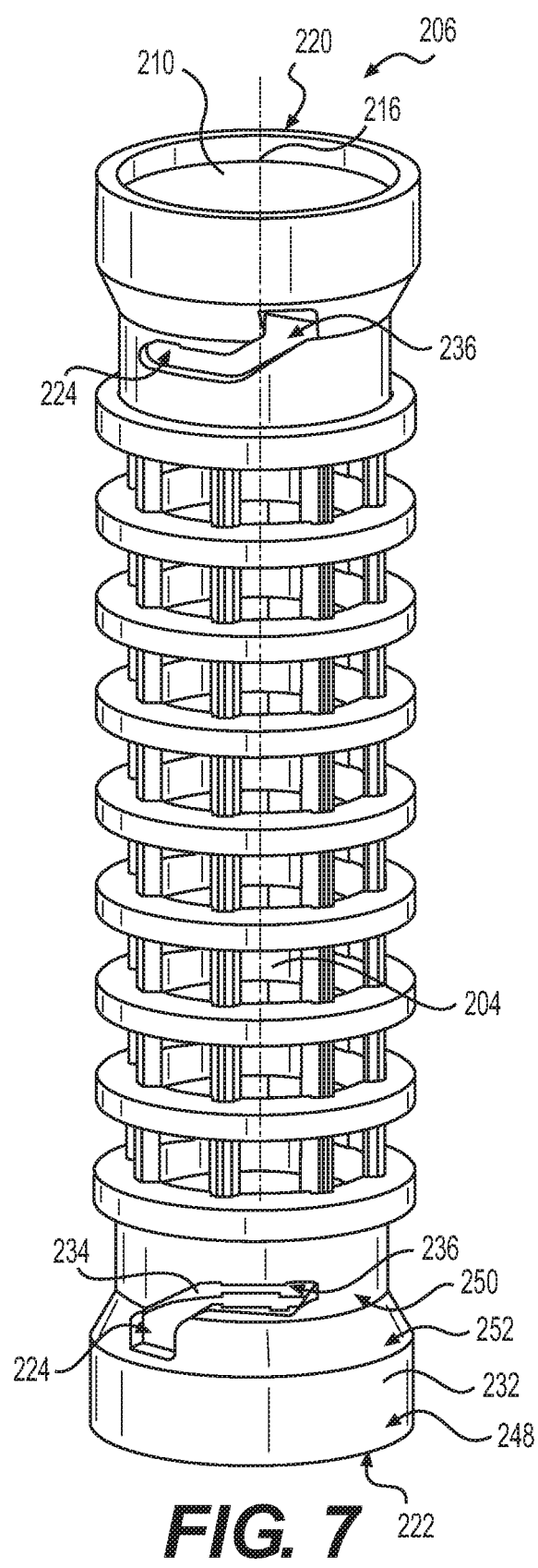
FIG. 7 is a perspective view of the center tube shown in isolation from the filter assembly of FIG. 1.

Starting with FIGS. 1 and 7, the filter element 200 may define a longitudinal axis 216, a radial direction 218, and a circumferential direction 217. Moreover, the filter element 200 may comprise an annular filter media 202 defining a central passage 219.

A center tube 206 may be disposed in the central passage 219 of the annular filter media 202 that defines a central reservoir 204. Accordingly, the annular filter media 202 surrounds the center tube 206 and the central reservoir 204. A top open end 220 may be joined to the center tube 206 that is disposed along the longitudinal axis 216. The top open end 220 includes an opening 210 allowing fluid to flow from the central reservoir 204 to the outside of the filter element 200 or vice versa.

Similarly, a bottom open end 222 may be joined to the center tube 206 axially opposite the top open end 220 disposed along the longitudinal axis 216. As best seen in FIG. 3, the bottom open end 222 may define a radially outer surface 232, and a radially inner surface 234 that is in communication with the central reservoir 204.

Looking at FIGS. 2 thru 4, a locking feature 236 may be disposed proximate to the bottom open end 222 of the center tube 206. The locking feature 236 may include an entrance slot 238 that is disposed on the radially inner surface 234 of the center tube 206 that extends axially upwardly from the bottom open end 222. This entrance slot is configured to allow the center tube 206 to slide over the tab 322 of the pedestal 300 alluded to earlier herein during assembly.

As best seen in FIG. 4, the locking feature 236 may further comprise a ramp slot 240 that extends axially upwardly and circumferentially counterclockwise from the entrance slot 238 along a predetermined direction 241. The ramp slot 240 is in communication with the entrance slot 238 so that as the tab 322 of the pedestal 300 moves upwardly in the entrance slot 238 when the center tube 206 moves downwardly, the tab 322 will eventually arrive at the ramp slot 240. Twisting the center tube 206 circumferentially will cause the center tube 206 to move downwardly, impinging upon the filter seal 120 (e.g. see FIG. 3). In other embodiments, this arrangement may be reversed such that the ramp slot extends axially upwardly and circumferentially clockwise. In such a case, the center tube will need to be twisted in the opposite direction.

With continued reference to FIG. 4, the locking feature 236 may further comprise a circumferential locking slot 242 that extends circumferentially counterclockwise from the ramp slot 240. The circumferential locking slot 242 is in communication with the ramp slot 240, and terminates at a stop surface 244. Consequently, as the center tube 206 is twisted circumferentially, the axial position of the center tube is substantially fixed by the tab 322 of the pedestal 300. Again, this arrangement may be reversed such that the circumferential locking slot extends in the clockwise direction, necessitating that the center tube be rotated in the opposite direction.

Continued twisting of the center tube 206 in the counterclockwise direction will allow the tab 322 to contact or nearly contact the stop surface 244, at which time the upward force exerted by the filter seal 120 causes the center tube 206 to move slightly upwardly until the tab 322 engages a detent notch 246 that extends axially downwardly from the circumferential locking slot 242 being in communication therewith. Now, the center tube 206 is locked into position both axially, radially and circumferentially against unintentional movement.

An angled surface 248 may extend from the detent notch 246 to the stop surface 244, matching the shape of the tab 322. Hence, the angled surface 248 may parallel to the predetermined direction 241 that the ramp slot 240 extends. Likewise, the stop surface 244 may extend axially to match shape of the tab 322.

Other configurations are possible for these various features.

Looking at FIGS. 4 and 7, the center tube 206 has a necked down configuration at the bottom open end 222 including an enlarged bottom annular portion 248, a reduced top annular portion 250, and a transitional annular portion 252 therebetween. The entrance slot 238 is formed by the enlarged bottom annular portion 248, and the transitional annular portion 252. The ramp slot 240 is formed by the transitional annular portion 252, and the reduced top annular portion 250. The circumferential locking slot 242, and the detent notch 246 are formed by the reduced top annular portion 250.

Again, other configurations for these features are possible in other embodiments of the present disclosure.

Looking at FIG. 7, it can be seen that the center tube 206 (and therefore the filter element 200), are constructed so that both ends are similarly or identically constructed. So, the center tube 206 may be rotated about an axis that extends through axial midpoint of the center tube and perpendicular to the longitudinal axis 216 an amount of 180 degrees and still be able to be installed with the pedestal 300. This may not be the case in other embodiments of the present disclosure. In such a case, the top locking feature may or may not be used to attach the base to the center tube. An example, of the use of both top and bottom locking features in a canister filer system will be discussed later herein.

The top portion of the entrance slot 238, and the entirety of the ramp slot 240, the circumferential locking slot 242, and detent notch 246 extend completely radially through the center tube 206. On the other hand, the lower portion of the entrance slot 238 does not extend completely radially through the center tube 206 (denoted by dotted lines). Thus, a side action may form the thru-portions of these features while a bottom core may form the blind portion of the entrance slot and contacts the side action. So, the center tube may be manufactured using a thermoplastic injection molding process. A nylon, a polyurethane, or any other suitable material may be used to form the center tube.

Other configurations for these features may be employed to facilitate the use of other manufacturing processes, etc.

Next, a pedestal 300 that may be used with a canister filter system 100, and a filter element 200 for positioning and retaining the filter element 200 in the canister filter system 100 will now be discussed with reference to FIGS. 4 and 5.

The pedestal 300 may comprise an at least partially annular body 302 defining a longitudinal axis 306, a radial direction 308, and a circumferential direction 310.

The body 302 may include a top annular portion 312 terminating at a top free end 314 as earlier described herein. A tab 322 extends radially from the top annular portion, 312. The tab 322 includes a first axial surface 328, a bottom circumferential surface 330, and a bottom ramp surface 332 extending from the bottom circumferential surface 330. The first axial surface 328 is configured to engage a surface of the entrance slot 238, the bottom circumferential surface 330 is configured to engage a surface of the circumferential locking slot 242, and the bottom ramp surface 332 is configured to engage a surface of the ramp slot 240 of the center tube 206 as previously described herein.

In addition, the tab 322 further comprises a top ramp surface 334 extending from the first axial surface 328 that is parallel to the bottom ramp surface 332 for engaging another surface of the ramp slot 240. A top circumferential surface 336 extends from the top ramp surface 334 that engages another surface of the circumferential locking slot 242. A second axial surface 338 connects the bottom ramp surface 332 to the top circumferential surface 336, and is configured to engage the stop surface 244 of the center tube 206.

The pedestal 300 may be complimentarily shaped to the bottom open end 222 of the center tube 206. Consequently as seen in FIG. 5, the pedestal 300 may have a bottom annular portion 318 that defines a bottom diameter 320, and a top annular portion 312 that defines a top diameter 316 that is less than the bottom diameter 320. Also, a flared annular portion 324 (may also be referred to as a funnel annular portion) connects the top annular portion 312 to the bottom annular portion 318.

The pedestal 300 may further comprise a canister portion 340 (e.g. may be attached thereto) and may include an annular outer wall 342 defining an outer diameter 344 that is greater than the bottom diameter 320 of the bottom annular portion 318 to form the annular cavity 118 (see FIG. 1). As best seen in FIG. 5, a support wall 346 that is configured to support the bottom annular portion 318, and a funnel wall 348 connecting the annular outer wall 342 to the support wall 346.

Figure 8:
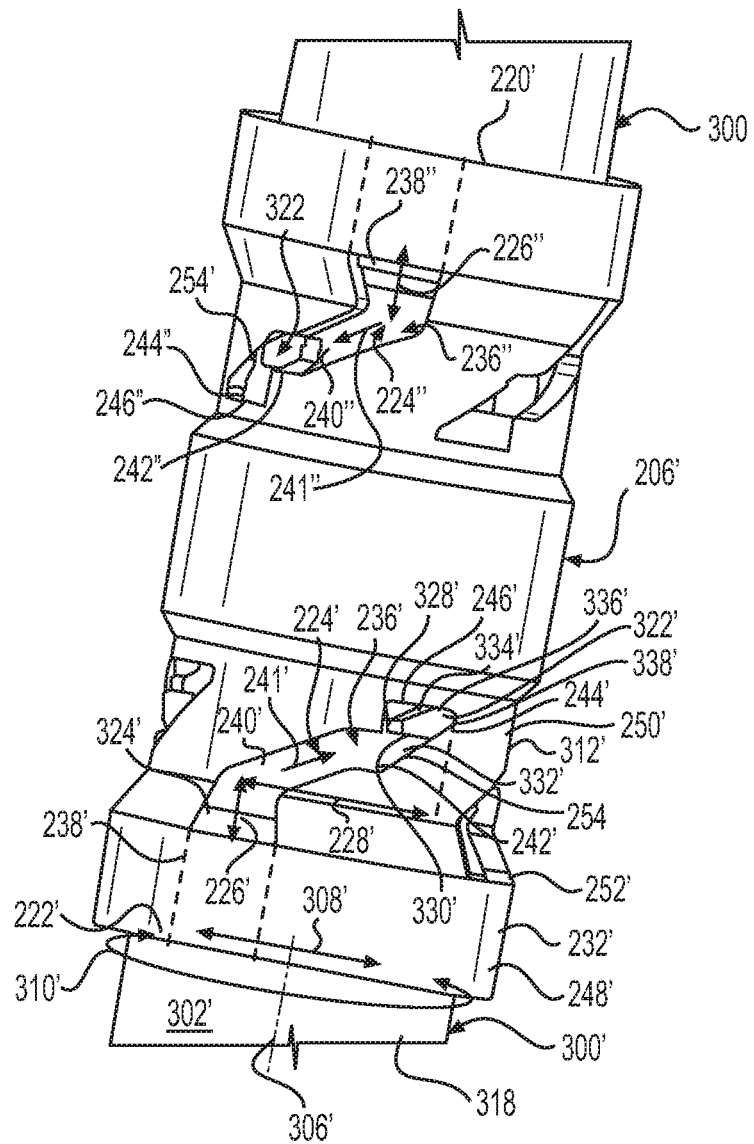
FIG. 8 is a perspective view showing conceptually how a center tube such as the one similar in construction to the center tube of FIG. 7 may be configured to mate with the base at the top end and the pedestal at the bottom end of a filter assembly.

Looking at FIGS. 1, 7 and 8, it may be understood that the canister filter system 100 and its center tube 206 may be modified so that the center tube 206 has both top and bottom locking features for attaching both the base 102 and the canister 104 to the filter element 200. As shown in FIG. 8, a top pedestal 300 may be provided that is identically configured to that of FIG. 5 except that it has been rotated 180 degrees about an axis passing through the axial midpoint of the center tube 206 and that is perpendicular to the longitudinal axis 216 of the center tube 206 so that the top pedestal 300 may be operatively associated with the base 102 instead of the canister 104 (e.g. attached to the base instead of the canister as previously described herein).

In FIG. 8, a bottom pedestal 300' may be provided that includes an at least partially annular body 302' defining a longitudinal axis 306', a radial direction 308', and a circumferential direction 310' that are defined the same way as those of the top pedestal 300.

The bottom pedestal 300' may include a top annular portion 312' that terminates at a top free end (not clearly shown but understood to be similar to what has been previously described for pedestal 300 or what is shown in FIG. 1), and that defines a top diameter (not clearly shown but understood to be similar to what has been previously described for pedestal 300 or what is shown in FIG. 1). Likewise, the bottom pedestal 300' may also include a bottom annular portion 318' defining a bottom diameter (not clearly shown but understood to be similar to what has been previously described for pedestal 300 or what is shown in FIG. 1) that is greater than the top diameter 316'. A flared annular portion 324' that connects the top annular portion 312' to the bottom annular portion 318'. Also, a bottom tab 322' extends radially from the top annular portion 312'.

The bottom annular portion 318' may define at least one thru-slot (not clearly shown but understood to be similar to what has been previously described for pedestal 300) that extends radially and possibly axially downwardly through the bottom annular portion 318' similar to pedestal 300 as previously described earlier herein. It is to be understood that the pedestal 300 may be substituted for the bottom pedestal 300' shown in FIG. 8 in some embodiments.

For example in FIGS. 1, 2 and 3, it is to be understood that the canister 104 may comprise an outer annular wall 124 that defines an outer diameter 126 that is greater than the bottom diameter of the bottom pedestal 300' (shown in FIG. 8). A support wall 346 would support the bottom annular portion 318' of the bottom pedestal 300', and an arcuate wall 130 would connect the support wall 346 to the outer annular wall 124.

As best seen in FIGS. 2 and 3, the filter seal 120 would contact the arcuate wall 130, forming a drain reservoir 132. Moreover, the bottom open end 222 of the modified center tube 206 would impinge upon the filter seal 120, creating a fluid tight seal between center tube 206 and the filter seal 120, and another fluid tight seal between the filter seal 120 and the arcuate wall 130. The arcuate wall may have another shape such as conical, etc. The filter seal may be omitted in some embodiments such as when the canister has a bottom closed end, etc.

Referring back to FIG. 8, the center tube 206' includes a bottom locking slot 224' that extends axially from the bottom open end 222' of the center tube 206 an axial distance 226', and then extends circumferentially a circumferential distance 228'. The center tube 206' may also have a top locking slot 224" that extends axially from the top open end 220' of the center tube 206' another axial distance 226", and then extends circumferentially in the opposite direction as compared to the bottom locking slot 224'.

Furthermore, the center tube 206' may define an inner diameter (not clearly shown but understood to be similar to what has been previously described for pedestal 300 or what is shown in FIG. 1) that is slightly greater than the top diameter of the bottom pedestal 300' that is disposed within the inner diameter of the center tube 206'. The bottom tab 322' of the bottom pedestal 300' is disposed in the bottom locking slot 224' and is configured to guide the movement of the center tube 206'. Also, the top pedestal 300 may define a diameter (e.g. 316) that is slightly less than the inner diameter of the center tube 206', and that is disposed within the inner diameter of the center tube 206'. The top tab 322 of the top pedestal 300 may be differently configured than the bottom tab 322' of the bottom pedestal 300', and the top tab 322 may be disposed in the top locking slot 224" to guide the movement of the base.

With continued reference to FIG. 8, a filter element with a center tube 206' having both top and bottom locking features that may be used with the filter canister system just described will now be discussed. It is to be understood that the center tube 206' shown in FIG. 8 is simplified to show the use of top and bottom locking features simultaneously.

In actuality, the middle portion of the center tube 206' would have perforations similar to what is shown in FIG. 7.

As alluded to earlier herein, the center tube 206' may have a bottom open end 222' that is joined to the center tube 206' opposite the top open end 220', both of which are disposed along the longitudinal axis 306'. The bottom open end 222' may define a radially outer surface 232', and a radially inner surface that is in communication with the central reservoir (not clearly shown in FIG. 8).

A first locking feature 236' may be disposed proximate to the bottom open end 222'. The first locking feature 236' may include a first entrance slot 238' that is disposed on the radially inner surface (not clearly shown in FIG. 8) of the center tube 206' extending axially upwardly from the bottom open end 222'. A first ramp slot 240' may extend axially upwardly and circumferentially counterclockwise from the first entrance slot 238' along a first predetermined direction 241', the first ramp slot 240' being in communication with the first entrance slot 238'. The entry slot may be axially tapered to provide a lead-in during assembly.

Similarly, a second locking feature 236" may be disposed proximate to the top open end 220'. The second locking feature 236" may include a second entrance slot 238" that is disposed on the radially inner surface (not clearly shown in FIG. 8) of the center tube 206' extending axially downwardly from the top open end 220'. A second ramp slot 240" may extend axially downwardly and circumferentially clockwise from the second entrance slot 238" along a second predetermined direction 241", the second ramp slot 240" being in communication with the second entrance slot 238".

As shown in FIG. 8, the first predetermined direction 241' and the second predetermined direction 241" are parallel to each other. For example, this may be true when the first locking feature 236' is identically configured as the second locking feature 236" when rotated about an axis that is perpendicular to the longitudinal axis 306' an amount of 180 degrees, and then aligned axially and circumferentially with the second locking feature 236". This may not be the case for other embodiments of the present disclosure.

The first locking feature may further comprise a first circumferential locking slot 242' extending circumferentially counterclockwise from the first ramp slot 240', the first circumferential locking slot 242' being in communication with the first ramp slot 240' and terminating at a first sloping surface 254 that extends axially upwardly and circumferentially counterclockwise.

Similarly, the second locking feature 236" may further comprise a second circumferential locking slot 242" extending circumferentially clockwise from the second ramp slot 240", the second circumferential locking slot 242" being in communication with the second ramp slot 240", and terminating at a second sloping surface 254' extending axially downwardly and circumferentially clockwise.

For the first locking feature 236', a first detent notch 246' may extend axially upwardly from the first circumferential locking slot 242' being in communication therewith. Likewise for the second locking feature 236", a second detent notch 246" may extend axially downwardly from the second circumferential locking slot 242" being in communication therewith.

The first detent notch 246' may terminate circumferentially at a first stop surface 244' that extends axially upwardly from the first sloping surface 254, and the second detent notch 246" may terminate circumferentially at a second stop surface 244" that extends axially downwardly from the second sloping surface 254'.

Looking at FIG. 8, the center tube 206' has a necked down configuration at the bottom open end 222' including an enlarged bottom annular portion 248', a reduced top annular portion 250', and a transitional annular portion 252' therebetween. The entrance slot 238' is formed by the enlarged bottom annular portion 248', the transitional annular portion 252', and the reduced top annular portion 250'. The first ramp slot 240' is formed by the reduced top annular portion 250'. The first circumferential locking slot 242', and the first detent notch 246' are formed by the reduced top annular portion 250'. The top open end 220' have be similarly described, being mirrored about an axial midplane of the center tube 206'.

Referring to FIGS. 5 and 8, a pair of pedestals 300, 300' that may be used with the filter element just described will be discussed in further detail.

Each of the pair of pedestals 300, 300' may comprise an at least partially annular body 300, 302' defining a longitudinal axis 306, 306, a radial direction 308, 308', and a circumferential direction 310, 310'.

Each may have a top annular portion 312, 312 terminating at a top free end 314, and a tab 322, 322' extending radially from the top annular portion 312, 312'. The tab 322, 322' may include a first axial surface 328, 328', a bottom circumferential surface 330, 330', and a bottom ramp surface 332, 332' extending from the bottom circumferential surface 330, 330'. As best seen in FIG. 8, the surface of one tab may be differently configured (e.g. have different dimensions) than the corresponding surface of the other tab but not necessarily so.

Still looking at FIGS. 5 and 8, each tab 322, 322' may further comprise a top ramp surface 334, 334' extending from the first axial surface 328, 328' that is parallel to the bottom ramp surface 332, 332', a top circumferential surface 336, 336' extending from the top ramp surface 334, 334', and a second axial surface 338, 338' connecting the bottom ramp surface 332, 332' to the top circumferential surface 336, 336'.

Each pedestal 300, 300' may further comprise a bottom annular portion 318, 318' that defines a bottom diameter 320, and the top annular portion 312, 312' defines a top diameter 316 that is less than the bottom diameter 320. A flared annular portion 324, 324' may connect the top annular portion 312, 312' to the bottom annular portion 320, 320'.

All of these various surfaces of one tab may be differently configured than the corresponding surfaces of the other tab. Hence, the tab of each of the pair of pedestals may be differently configured.

As shown in FIG. 8, multiple locking features and tabs may be used at both ends of the center tube 206', but not necessarily so.

During installation for the embodiment in FIG. 8, the base and/or top pedestal is first attached to the center tube of the filter element. The top tab is prevented from entering the upper detent notch due to its dimensions. Then, the base and filter element are attached to the bottom pedestal until the bottom tab is seated in the lower detent notch since the bottom tab is smaller than the top tab.

Next, an interface for use with a filter system similar to that described earlier herein will be discussed with reference to FIGS. 9 thru 11.

The interface 400 may comprise a filter element 200 that is configured the same as or similar to that as previously described herein. The filter element 200 may include a first open end 402 defining a first locking slot 404, and a second open end 406 defining a second locking slot 408. A first pedestal 410 may be provided that includes a first tab 412 that is disposed in the first locking slot 404. Similarly, a second pedestal 414 may be provided including a second tab 416 that is disposed in the second locking slot 408. The second tab 416 may be differently configured as the first tab 412. Either tab may have any suitable configuration including rectangular, square, elliptical, circular, quadrilateral, etc.

In some embodiments, the first locking slot 404 may be identically configured as the second locking slot 408 when rotating the geometry of the first slot about an axis that is perpendicular to the longitudinal axis 216 of the filter element 200 an amount of 180 degrees and then aligning the first locking slot 404 with the second locking slot 408 axially, circumferentially, and radially. This may not be the case in other embodiments of the present disclosure.

Figure 9:
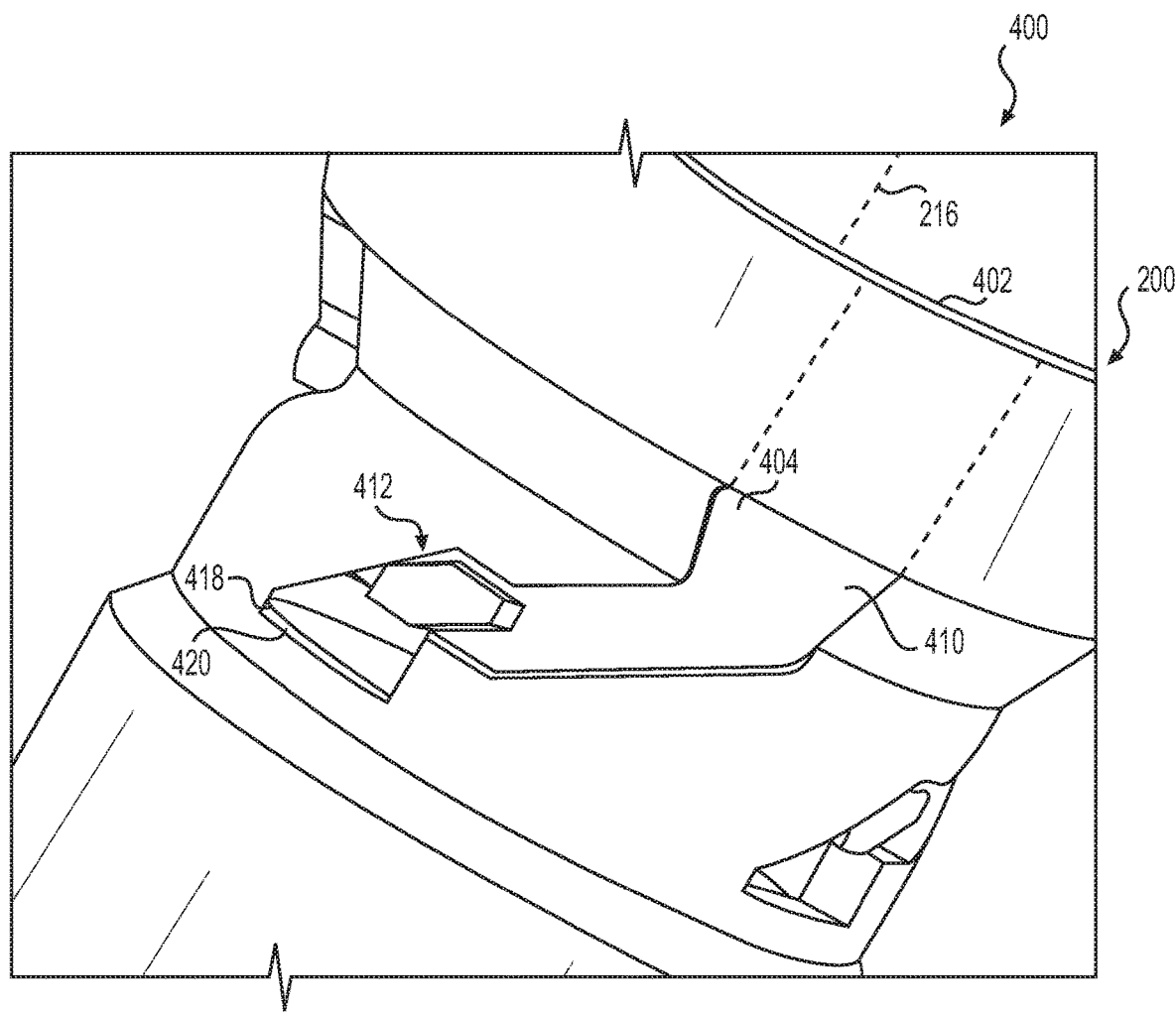
FIG. 9 is an enlarged detail view showing the mating of the locking slot of the center tube and pedestal similar to the bottom portion of FIG. 8 except the pedestal is shown near the top in FIG. 9. The tab of the pedestal is shown being rotated during an assembly or locking operation.
Figure 10:
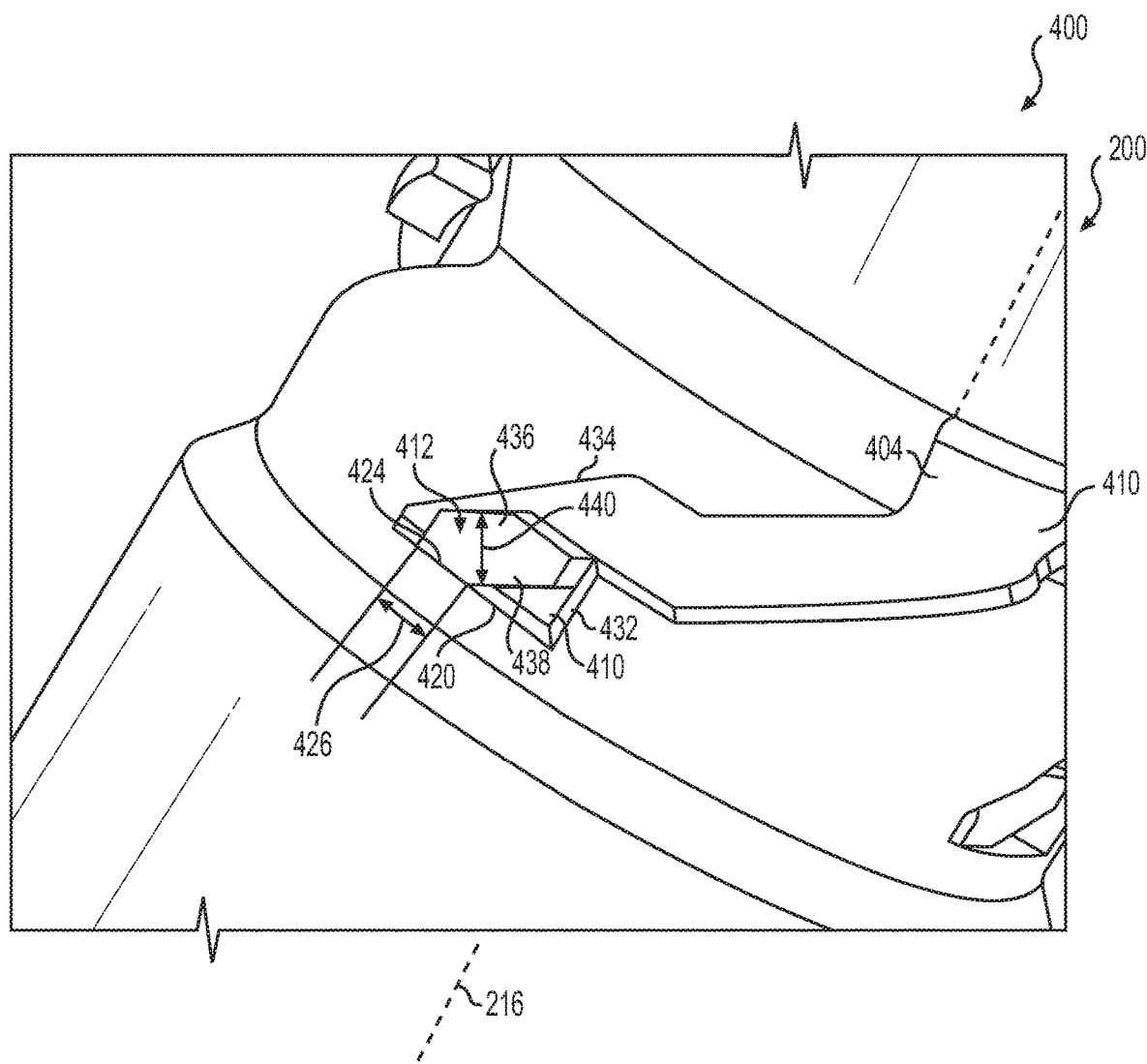
FIG. 10 illustrates that the tab of the pedestal of FIG. 9 is small enough to fall into the detent notch.

As illustrated in FIGS. 9 and 10, the first locking slot 404 may include a first detent notch 418 that defines an extremity 420 that is the furthest axially from the first open end 402 of the filter element 200, and the first tab 412 may be configured to move axially into and out of the first detent notch 418.

Figure 11:
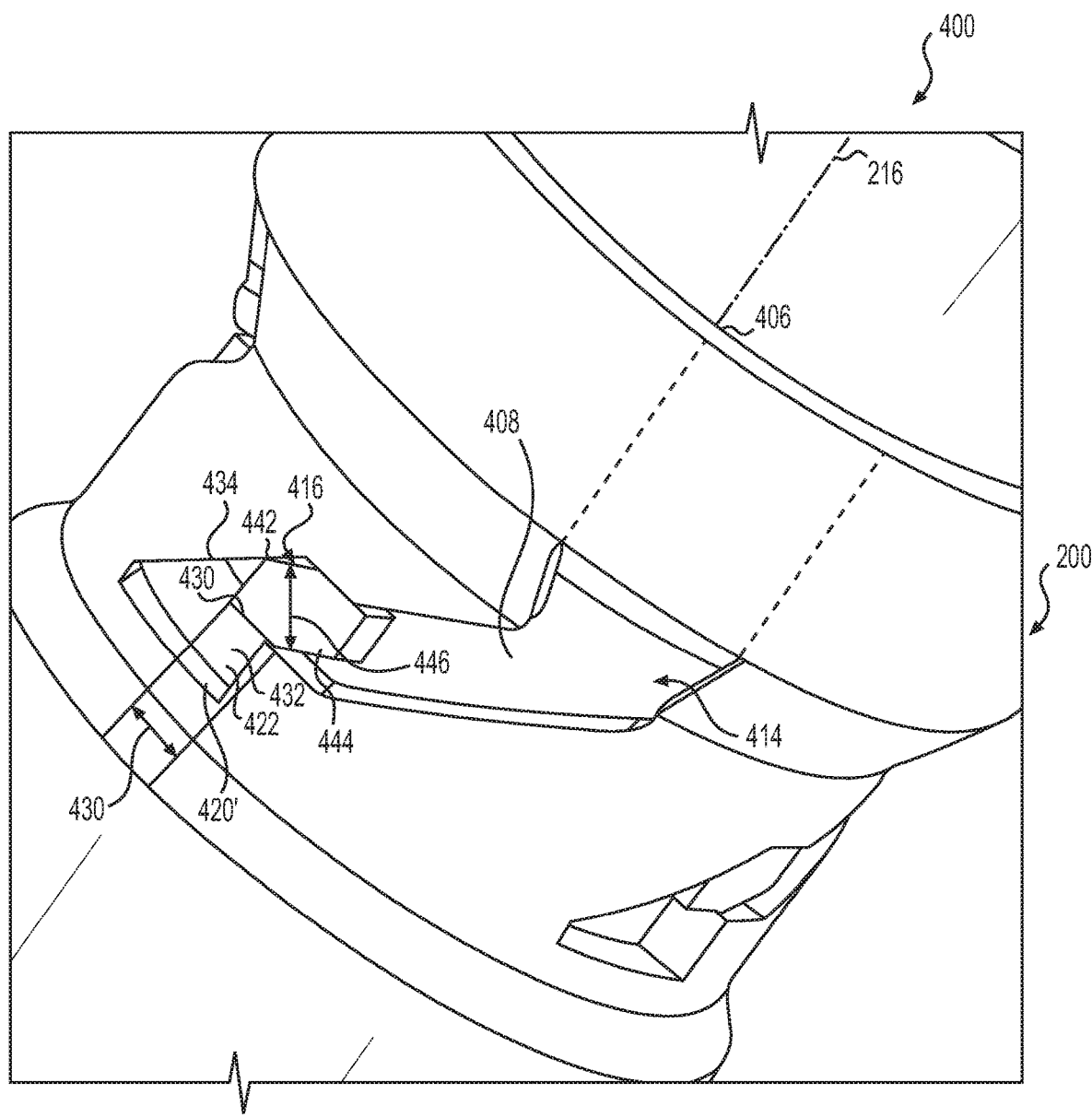
FIG. 11 is an enlarged detailed view showing the mating of the locking slot of the center tube and pedestal similar to the top portion of FIG. 8. The tab of the pedestal is shown to be too large to fit into the detent notch.

As best seen in FIG. 11, the second locking slot 408 may include a second detent notch 422 that defines an extremity 420' that is furthest axially from the second open end 406 of the filter element 200, and the second tab 416 may be configured to be prevented from moving into and out of the second detent notch 422.

To that end, FIGS. 10 and 11 show that the first tab 412 includes a first bottom circumferential surface 424 defining a first bottom circumferential surface width 426, and the second tab 416 includes a second bottom circumferential surface 428 defining a second bottom circumferential surface width 430 that is greater than the first bottom circumferential surface width 424. The difference in these structures along with the necked throat of the entrance of the detent notches, formed by an axial throat surface 432 and a slanted throat surface 434, allows the first tab to enter the detent notch and not the second tab.

Also, the first tab 412 includes a first ramp surface 436 and a second ramp surface 438 that are parallel to each other and that define a first ramp width 440 that measured perpendicularly to the first ramp surface 436. Likewise, the second tab 416 defines a third ramp surface 442 and a fourth ramp surface 444 that are parallel to each other and that define a second ramp width 446 that is measured perpendicularly to the third ramp surface 442 and the fourth ramp surface 444. The second ramp width 446 may be greater than the first ramp width 440, blocking its entry into the detent notch.

Accordingly, the first tab 412 may be configured to move axially (into the entrance portion of the first locking slot 404), diagonally (along the ramp portion of the first locking slot 404), circumferentially (in the circumferential portion of the first locking slot 404) and axially into the first detent notch 418, while the second tab 416 is configured to move axially, diagonally, and circumferentially in like manner as the first tab, except that the second tab 416 reaches a stop 448 (see FIG. 11) in the second locking slot 408 before entering the second detent notch 422. This may not be the case for other embodiments of the present disclosure.

Any of the aforementioned features may be varied in configuration to be different in other embodiments of the present disclosure. In particular, the locking slot may follow any desirable path and may have differently configured walls that form them while the tabs may have any suitable configuration including round, polygonal, etc.

INDUSTRIAL APPLICABILITY

In practice, a filter element, a pedestal, or a canister filter system according to any embodiment disclosed herein may be obtained or provided in an OEM (original equipment manufacturer) or aftermarket context. The various features previously discussed may be used to both properly orient, position, and lock the various components of the canister filter system into place.

The center tube and the pedestal may be made from any suitable material including plastic, metal, etc. It may be desirable to choose materials that are chemically compatible with the fluids being filtered.

In previous designs, there may be a problem related to the attachment of the filter element to the housing (canister). Conventionally, the attachment of filter element to the housing, maintaining the proper force on the seal, and providing alignment of the filter element to the housing may be difficult.

Various embodiments of the present disclosure allow a newly developed method to install the filter element to the housing. The filter installation helps to ensure the proper alignment of filter element within the housing as well as maintaining the downward force on the seal. Further, the new design of filter element includes slots in the center tube that will allow tabs on the filter housing pedestal to engage. When the filter is rotated, it will provide locking of the filter element with the housing and the required force to help ensure the proper engagement of the seal with the housing base for the separation of pure and impure water, etc. Moreover, the slots and pedestal tabs can be changed (in number, position, configuration, etc.) so that wrong filter is not used resulting in damage to machine components.

More specifically, the tab of the lower pedestal engages the corresponding locking slot of the center tube, providing downward force to push bottom seal into place when the filter is rotated into housing at installation. Also, the position of the top seal is also provided so that it will seal properly.

It is contemplated that other embodiments of the present disclosure may work or be structured differently so not all of the benefits just described may be obtained.

In some embodiments, the filter element/center tube may sit on top of the tab(s) at the bottom of the housing. In such a case, a proper seal may be provided at the top end, but the user may have to provide the force to overcome the seal at the bottom, etc.

It is further contemplated that the features of the pedestal including the tab may be swapped for the features of the center tube/filter element including the locking feature/slot, etc. in other embodiments of the present disclosure.

Figure 12:
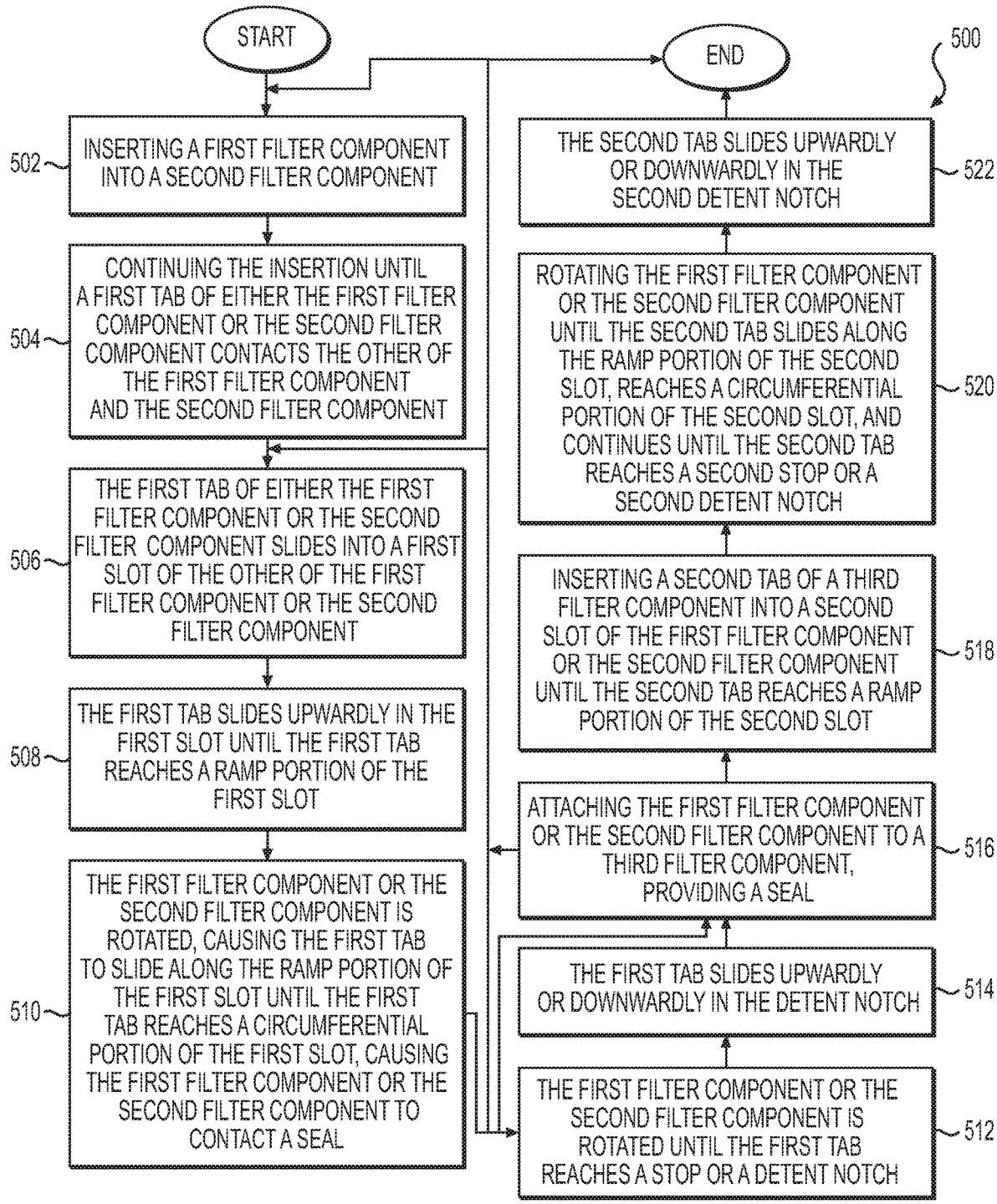
FIG. 12 is a flow chart containing a method of operation or assembly associated with FIGS. 9 thru 10.

In light of the foregoing, a method of assembly of a canister filter system according to an embodiment of the present application may be employed as depicted in FIG. 12.

The method 500 may comprise inserting a first filter component into a second filter component (step 502), and continuing the insertion until a first tab of either the first filter component or the second filter component contacts the other of the first filter component and the second filter component (step 504). For example, the filter element may be inserted into a filter base or a canister (housing), etc. until the filter element contacts the tab of the filter base or canister (or vice versa).

In particular embodiments, the first tab of either the first filter component or the second filter component slides into a first slot of the other of the first filter component or the second filter component (step 506).

Sometimes, the first tab slides upwardly in the first slot until the first tab reaches a ramp portion of the first slot (step 508, e.g. see FIGS. 2 thru 4, 8).

Then, the first filter component or the second filter component may be rotated, causing the first tab to slide along the ramp portion of the first slot until the first tab reaches a circumferential portion of the first slot, causing the first filter component or the second filter component to contact a seal (step 510, e.g. see FIGS. 2 thru 4).

Next, the first filter component or the second filter component (or both) may be rotated until the first tab reaches a stop or a detent notch (step 512, e.g. see FIGS. 4, 10, and 12).

In some embodiments, the first tab slides upwardly or downwardly in the detent notch (step 514, e.g. see FIGS. 4, 8, and 10).

In yet further embodiments, the method 500 may further comprising attaching the first filter component or the second filter component to a third filter component, providing a seal (step 516, e.g. see FIG. 1 which indicates the canister and the filter element may be attached to the base to create one or more seals).

The method 500 may also include inserting a second tab of a third filter component into a second slot of the first filter component or the second filter component until the second tab reaches a ramp portion of the second slot (step 518, e.g. see FIGS. 1, 8 thru 11).

In such a case, the method 500 may further comprising rotating the first filter component or the second filter component until the second tab slides along the ramp portion of the second slot, reaches a circumferential portion of the second slot, and continues until the second tab reaches a second stop or a second detent notch (step 520).

If a second detent notch is reached, then the second tab may slide upwardly or downwardly in the second detent notch (step 522).

Once assembled as best seen in FIG. 1 for some embodiments of the present disclosure, a bottom seal 140, an inner top seal 142, and an outer top seal 144 may be created to help prevent any fluid from leaking.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A filter element that includes at least a partially annular configuration and that defines a longitudinal axis, a radial direction, and a circumferential direction, the filter element comprising:
    an annular filter media defining a central passage;
    a center tube that is disposed in the central passage of the annular filter media that defines a central reservoir, and the annular filter media surrounds the center tube and the central reservoir;
    a top open end joined to the center tube disposed along the longitudinal axis, the top open end including an opening allowing fluid to flow from the central reservoir to the outside of the filter element, the top open end defining a topmost extremity of the center tube;
    a bottom open end joined to the center tube opposite the top open end disposed along the longitudinal axis, the bottom open end defining a radially outer surface and a radially inner surface that is in communication with the central reservoir, the bottom open end defining a bottommost extremity of the center tube;
    a first locking feature disposed proximate to the bottom open end, the first locking feature including a first entrance slot that is disposed on the radially inner surface of the center tube extending axially upwardly from the bottom open end, and a first ramp slot extending axially upwardly and circumferentially counterclockwise from the first entrance slot along a first predetermined direction, the first ramp slot being in communication with the first entrance slot; and
    a second locking feature disposed proximate to the top open end, the second locking feature includes a second entrance slot that is disposed on the radially inner surface of the center tube extending axially downwardly from the top open end, and a second ramp slot extending axially downwardly and circumferentially clockwise from the second entrance slot along a second predetermined direction, the second ramp slot being in communication with the second entrance slot.

2. The filter element of claim 1 wherein the first predetermined direction and the second predetermined direction are parallel to each other.

3. The filter element of claim 2 wherein the first locking feature further comprises
    a first circumferential locking slot extending circumferentially counterclockwise from the first ramp slot, the first circumferential locking slot being in communication with the first ramp slot and terminating at a first sloping surface extending axially upwardly and circumferentially counterclockwise; and
    the second locking feature further comprises
    a second circumferential locking slot extending circumferentially clockwise from the second ramp slot, the second circumferential locking slot being in communication with the second ramp slot and terminating at a second sloping surface extending axially downwardly and circumferentially clockwise.

4. The filter element of claim 3 wherein the first locking feature further comprises a first detent notch that extends axially upwardly from the first circumferential locking slot being in communication therewith, and the second locking feature further comprises a second detent notch that extends axially downwardly from the second circumferential locking slot being in communication therewith.

5. The filter element of claim 4 wherein the first detent notch terminates circumferentially at a first stop surface that extends axially upwardly from the first sloping surface, and the second detent notch terminates circumferentially at a second stop surface that extends axially downwardly from the second sloping surface.

6. The filter element of claim 5 wherein the first locking feature is identically configured as the second locking feature when rotated about an axis that is perpendicular to the longitudinal axis, and aligned axially and circumferentially with the second locking feature.

* * * * *